US012773302B2

(12) United States Patent
Sato

(10) Patent No.: US 12,773,302 B2
(45) Date of Patent: Oct. 27, 2026

(54) INTRAORAL SHAPE ACQUISITION DEVICE AND INTRAORAL SHAPE ACQUISITION METHOD

(71) Applicant: DSi CORPORATION, Tokyo (JP)

(72) Inventor: Hiroshi Sato, Tokyo (JP)

(73) Assignee: DSi Corporation, Tokyo (JP)

( * ) Notice: Subject to any disclaimer, the term of this patent is extended or adjusted under 35 U.S.C. 154(b) by 285 days.

(21) Appl. No.: 18/561,826

(22) PCT Filed: May 19, 2021

(86) PCT No.: PCT/JP2021/018974
§ 371 (c)(1),
(2) Date: Nov. 17, 2023

(87) PCT Pub. No.: WO2022/244139
PCT Pub. Date: Nov. 24, 2022

(65) Prior Publication Data

US 2024/0225798 A1 Jul. 11, 2024

(51) Int. Cl.
*A61C 9/00* (2006.01)
*A61C 17/022* (2006.01)
(Continued)

(52) U.S. Cl.
CPC .......... *A61C 9/0053* (2013.01); *A61C 17/022* (2013.01); *G06T 1/0007* (2013.01);
(Continued)

(58) Field of Classification Search
CPC ... A61C 9/0053; A61C 17/022; A61C 1/0061; A61C 19/04; A61C 9/0046;
(Continued)

(56) References Cited

U.S. PATENT DOCUMENTS 5,286,201 A * 2/1994 Yu .......................... A61C 17/00
433/80
2010/0145189 A1* 6/2010 Hintersehr ........... A61B 5/1077
600/425
(Continued)

FOREIGN PATENT DOCUMENTS

JP 2009-297392 A 12/2009
JP 2016-508754 A 3/2016
(Continued)

OTHER PUBLICATIONS

European Search Report issued on Feb. 14, 2025 for European patent application No. 21940755.8.
(Continued)

*Primary Examiner* — Jonathan A Boyd
(74) *Attorney, Agent, or Firm* — Faegre Drinker Biddle & Reath LLP

(57) ABSTRACT

An intraoral shape acquisition device 1 capable of accurately acquiring an intraoral shape of a saliva, blood or other adherent area or a subgingival margin area includes a scanner 111 for acquiring an intraoral shape by imaging the inside of the mouth and an air blower 113 for blowing compressed air, the air blower 113 being capable of The air blower 113 blows the compressed air against the object to be imaged when the scanner 111 performs the imaging.

4 Claims, 4 Drawing Sheets

(51) Int. Cl.
*G06T 1/00* (2006.01)
*G06T 7/00* (2017.01)

(52) U.S. Cl.
CPC ...... *G06T 7/00* (2013.01); *G06T 2207/20081* (2013.01); *G06T 2207/30036* (2013.01)

(58) Field of Classification Search
CPC ..................... G06T 1/0007; G06T 7/00; G06T 2207/20081; G06T 2207/30036; G06T 7/11; G06T 2200/08; A61B 1/24; A61B 5/0088
See application file for complete search history.

(56) References Cited

U.S. PATENT DOCUMENTS

| | | | | |
|---|---|---|---|---|
| 2015/0348320 | A1 | 12/2015 | Pesach et al. | |
| 2018/0132980 | A1 | 5/2018 | Weisenberg | |
| 2021/0100643 | A1* | 4/2021 | Weiss | G06N 3/047 |
| 2021/0321872 | A1* | 10/2021 | Saphier | A61B 5/004 |

FOREIGN PATENT DOCUMENTS

| | | | |
|---|---|---|---|
| JP | 2018-047299 | A | 3/2018 |
| JP | 2018-514309 | A | 6/2018 |
| JP | 2020-006082 | A | 1/2020 |
| KR | 10-2016-0020268 | A | 2/2016 |
| KR | 10-2200999 | B1 | 1/2021 |

OTHER PUBLICATIONS

Korean Office Action issued Jan. 21, 2026 in Application No. 10-2023-7042775.

* cited by examiner

INTRAORAL SHAPE ACQUISITION DEVICE AND INTRAORAL SHAPE ACQUISITION METHOD

CROSS REFERENCE TO PRIOR APPLICATIONS

This application is the National Stage of International Application No. PCT/JP2021/018974 filed May 19, 2021, which is herein incorporated by reference in its entirety.

TECHNICAL FIELD

This invention relates to an intraoral shape acquisition device and a method for acquiring intraoral shape, and specifically to a technique for accurately acquiring intraoral shape data in areas where saliva, blood, etc. adhere or in subgingival marginal areas.

BACKGROUND ART

In recent years, with the progress of digitization (digital dentistry) in the dental industry, equipment that enables treatment to be performed more simply and precisely than before has appeared. For example, a device called an Intra Oral Scanner (IOS) can capture images of a patient's intraoral shape by means of a reader called a wand and output the intraoral shape as digital data (model). Typically, the wand emits light to an object (teeth, gingiva, etc.), and the reflected light is detected by a sensor to acquire point group data showing the three-dimensional shape of the object.

On the other hand, the following problems have been pointed out with IOS. If the object is wet with saliva, blood, etc., the IOS may not be able to generate an accurate model because it cannot obtain appropriate reflected light. In addition, since the IOS can only capture images of the visible areas of the intraoral shape, it is usually unable to model the invisible areas below the gingival margin. A dental technical product produced based on the inaccurate model generated due to these problems will be ill-fitting, i.e., it will not fit snugly in the intraoral shape.

To solve these problems, measures have been taken to constantly aspirate saliva and blood during imaging. In addition, when imaging the subgingival area, a procedure to separate the abutment tooth from the gingiva (pressure drainage) was performed. If bleeding was caused by pressure drainage, it was necessary to use suction as well.

In Patent Literature 1 and 2, an intraoral scanner that obtains the shape of the abutment tooth under the gingival margin by tracing the tooth surface with a stylus-shaped measuring jig is disclosed.

CITATION LIST

Patent Literature

Patent Document 1: JP 2018-047299 A
Patent Document 2: JP 2016-508754 A

SUMMARY OF THE INVENTION

Problem to be Solved by the Invention

However, the technique of using suction or pressure drainage in combination with imaging requires a great deal of time and effort on the part of dentists. It has been also physically burdensome for the patient. In order to adopt the method described in Patent Literature 1 or 2, dentists have needed to become proficient in the use of a special measuring jig.

The purpose of this invention is to solve such problems and to provide an intraoral shape acquisition device and a method for acquiring intraoral shapes that can accurately acquire intraoral shapes in areas where saliva, blood, etc. adhere or in subgingival marginal areas.

Solution to Problem

The intraoral shape acquisition device according to one embodiment of the present invention includes a scanner that acquires an intraoral shape by imaging the inside of the mouth, and an air blower that blows compressed air, the air blower blowing compressed air at the object to be imaged when the scanner performs the imaging.

The intraoral shape acquisition device in accordance with one embodiment of the present invention has the scanner and the air blower built into a wand.

In the intraoral shape acquisition device pertaining to one form of the invention, the air blower is detachable from the wand in which the scanner is built in.

The intraoral shape acquisition device according to an embodiment of the present invention further includes an information processing unit having a sensing data acquisition unit that receives sensing data indicating the intraoral shape from the scanner and a model generation unit that generates a three-dimensional model based on the sensing data.

The intraoral shape acquisition device according to an embodiment of the present invention, the scanner continuously acquires the sensing data indicating the intraoral shape while the air blower is injecting the compressed air against the object to be imaged, and the information processing device continuously acquires the sensing data indicating the intraoral shape while the air blower is injecting compressed air against the object to be imaged, and the information processing device continuously acquires the intraoral shape based on the characteristics of changes in the sensing data with the passage of time. The information processor further has an abutment tooth identification unit that identifies the gingiva and the abutment tooth included in the model based on the characteristics of the change of the sensing data over time.

Advantageous Effect of the Invention

The present invention can provide an intraoral shape acquisition device and a method for acquiring intraoral shapes that can accurately acquire the intraoral shapes of areas to which saliva, blood, etc. adhere or subgingival marginal areas.

DESCRIPTION OF EMBODIMENTS

The following is a detailed description of specific embodiments in which the invention is applied, with reference to the drawings.

Embodiment 1

Figure 1:
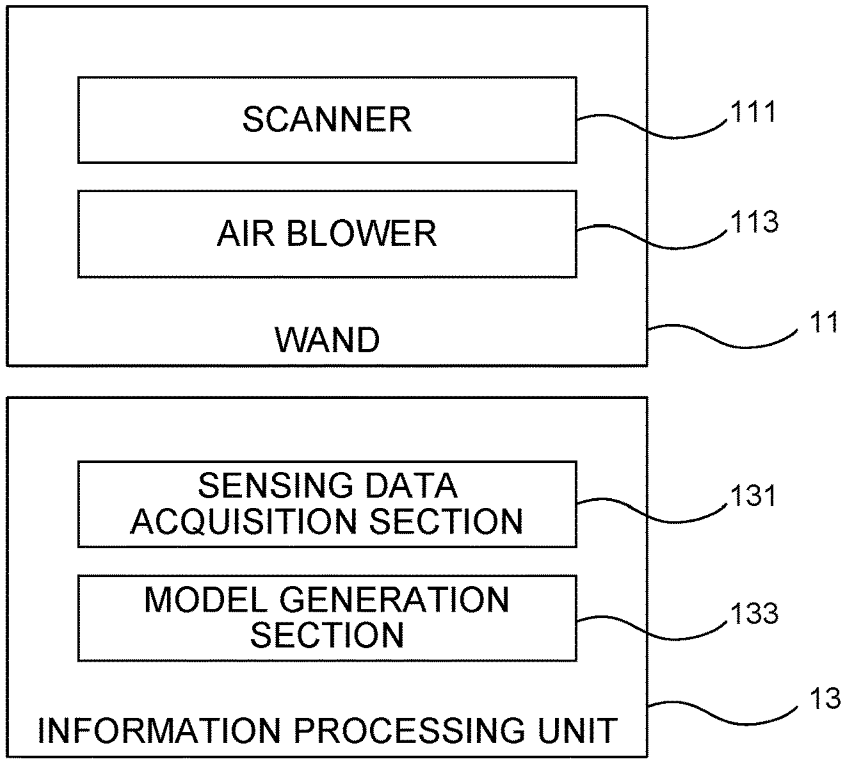
FIG. 1 is a block diagram showing the configuration of the intraoral shape acquisition device according to Embodiment 1.

FIG. 1 is a block diagram showing the configuration of the intraoral shape acquisition device 1. The intraoral shape acquisition device 1 includes a wand 11 and an information processing unit 13.

Figure 2:
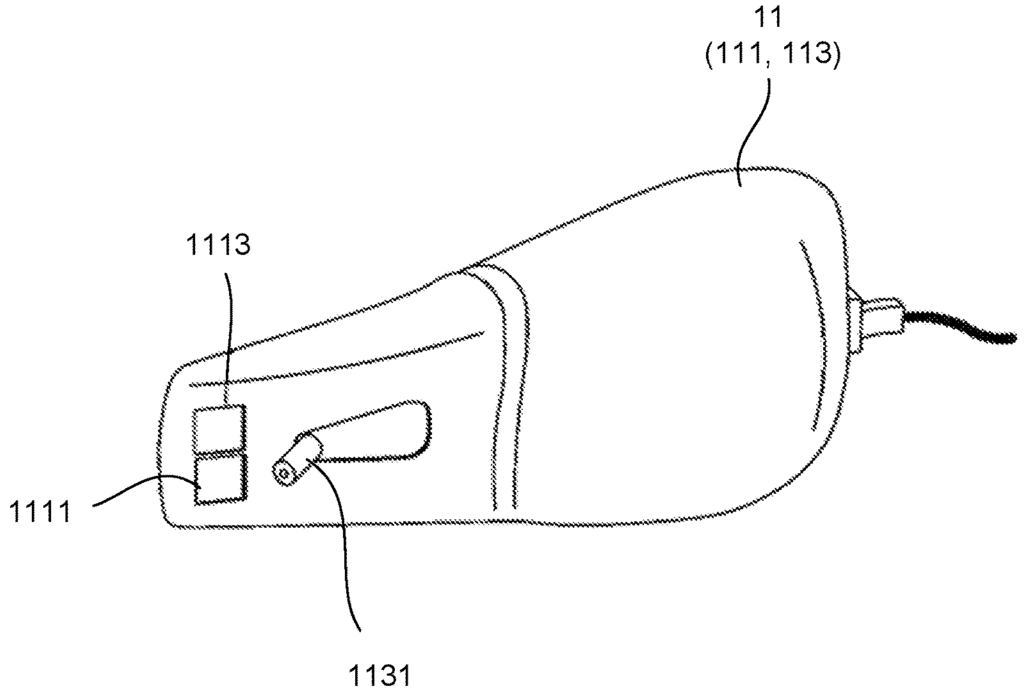
FIG. 2 is a diagram showing the appearance of the wand.

The wand 11 is typically a wand-shaped device that can be grasped by a dentist and used to capture the intraoral shape of a patient. FIG. 2 is a diagram of the wand 11. The wand 11 is equipped with a scanner 111 and an air blower 113. In this example, the scanner 111 and air blower 113 are built into the housing of the wand 11.

The scanner 111 includes a light source 1111 and a sensor 1113. The light source 1111 emits light to a plurality of points on the object surface. The reflected light from each point on the object surface is detected by the sensor 1113. Although FIG. 2 shows an example of the light source 1111 and sensor 1113 arranged in parallel near the tip of the wand 11 housing, this arrangement may be changed as needed. For example, the light source 1111 or sensor 1113 may be arranged within the housing of the wand 11. In this case, an optical path between the light source 1111 or sensor 1113 and the outside of the enclosure can be designed so that the emitted or reflected light passes through this optical path.

The information processing unit 13 includes a sensing data acquisition unit 131 and a model generation unit 133. The sensing data acquisition section 131 acquires the detection results (sensing data) of reflected light by the sensor 1113. The model generation unit 133 identifies the distance from the scanner 111 to each point on the object surface based on the sensing data using known methods such as the active wavefront sampling method and the confocal method, for example. It also identifies the coordinates of each point on the object surface based on this distance. The model generation unit 133 outputs the point group data of each point on the object surface or 3D data (polygon data, etc.) created based on this point group data as a model.

The information processing unit 13 has hardware such as a processing unit (CPU), storage device, input/output device, and communication device. Each of the above-mentioned processing units (131, 133) is logically realized by the CPU executing a program stored in the memory device.

The air blower 113 injects compressed air from the jet 1131. In the example shown in FIG. 2, the jet 1131 of the air blower 113 is located near the tip of the housing of the scanner 111. The direction of the jet 1131 is preferably variable, but may be fixed. In any case, the direction of the jet 1131 shall be set so that compressed air can be efficiently injected onto the object. The air blower 113 injects compressed air onto the object when the scanner 111 is imaging the object (including before or during imaging). The jet of compressed air disperses and removes saliva, blood, and other substances present on the surface of the object. This allows the scanner 111 to acquire accurate reflected light from the object surface. When compressed air is injected into the pocket-like region between the gingiva and abutment teeth, the compressed air pushes the pocket open. This allows easy imaging of the abutment tooth below the gingival margin without the need for pressure drainage or other measures.

The air blower 113 may be configured to automatically start blowing compressed air in conjunction with the operation of the scanner 111. Alternatively, the air blower 113 may be equipped with a button or the like to manually start the compressed air injection.

Figure 3:
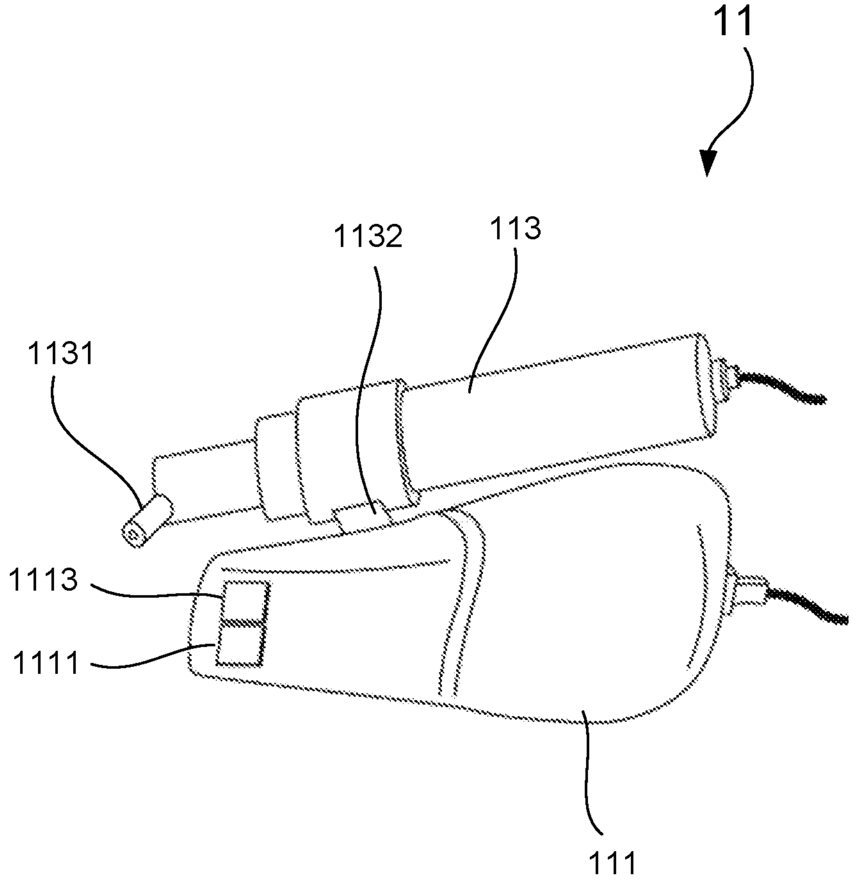
FIG. 3 is a diagram showing the appearance of the wand.

In the example of FIG. 2, the scanner 111 and the air blower 113 are integrated, but the two may be configured to be separable. For example, as shown in FIG. 3, the wand 11 may be realized by externally attaching the air blower 113 via attachment 1132 to the conventional scanner 111.

According to the present embodiment, the air blower 113 injects compressed air onto the object when the scanner 111 photographs the object. This allows an accurate model of the object to be obtained by one-handed operation only, without the need for suction or pressure drainage or other measures, even in situations where the object is wet with saliva or blood, or where the object is under the gingival margin. Therefore, the dentist's time and effort can be reduced compared to the conventional method. The physical burden on the patient can also be reduced.

Embodiment 2

According to Embodiment 1, it is possible to easily photograph the abutment tooth below the gingival margin. Embodiment 2 further provides a means to automatically identify the abutment tooth and gingiva.

When compressed air is injected into the pocket-like area between the gingiva and abutment tooth, the pocket is pushed open by the compressed air. The objects (abutment teeth and gingiva) subjected to the compressed air jet vibrate, but the characteristics of the vibration vary greatly depending on the area. In other words, there should be differences in amplitude and period between the gingiva, which is relatively soft, and the abutment tooth, which is hard and fixed to the bone.

Therefore, in this system, the condition around the abutment tooth under the gingival margin is continuously imaged while compressed air is first injected. In other words, "moving images" are captured at a predetermined frame rate. Next, the captured video is analyzed to detect differences in the vibration characteristics of the object. This is used to discriminate between the abutment teeth and gingiva in the model.

Figure 4:
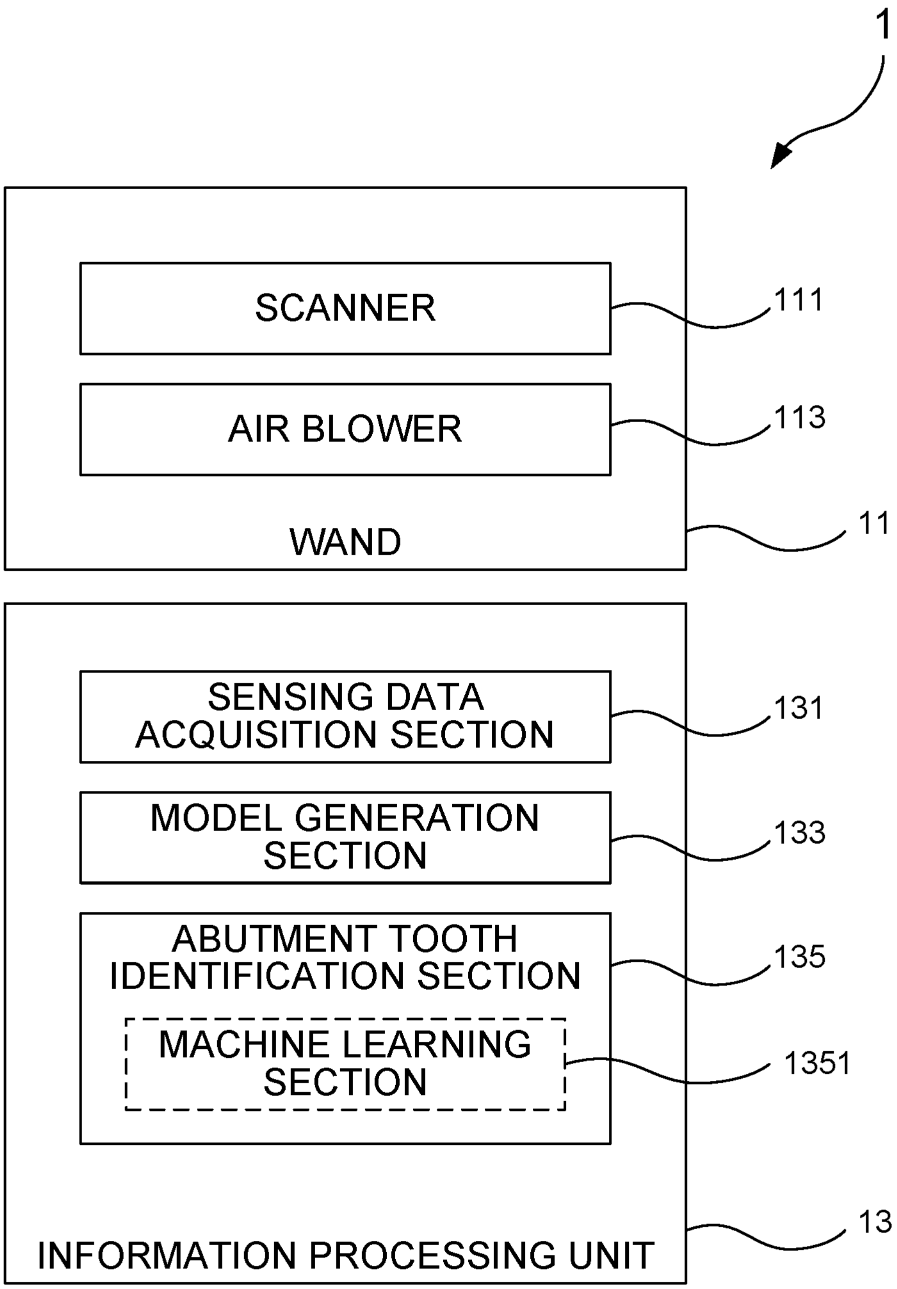
FIG. 4 is a block diagram showing the configuration of the intraoral shape acquisition device according to Embodiment 2.

FIG. 4 is a block diagram showing the configuration of the intraoral shape acquisition device 1 according to Embodiment 2.

The information processing unit 13 has an abutment tooth identification unit 135 that performs the process of discriminating between the abutment tooth and the gingiva. The other components of the intraoral shape acquisition device 1 are the same as in Embodiment 1.

Figure 5:
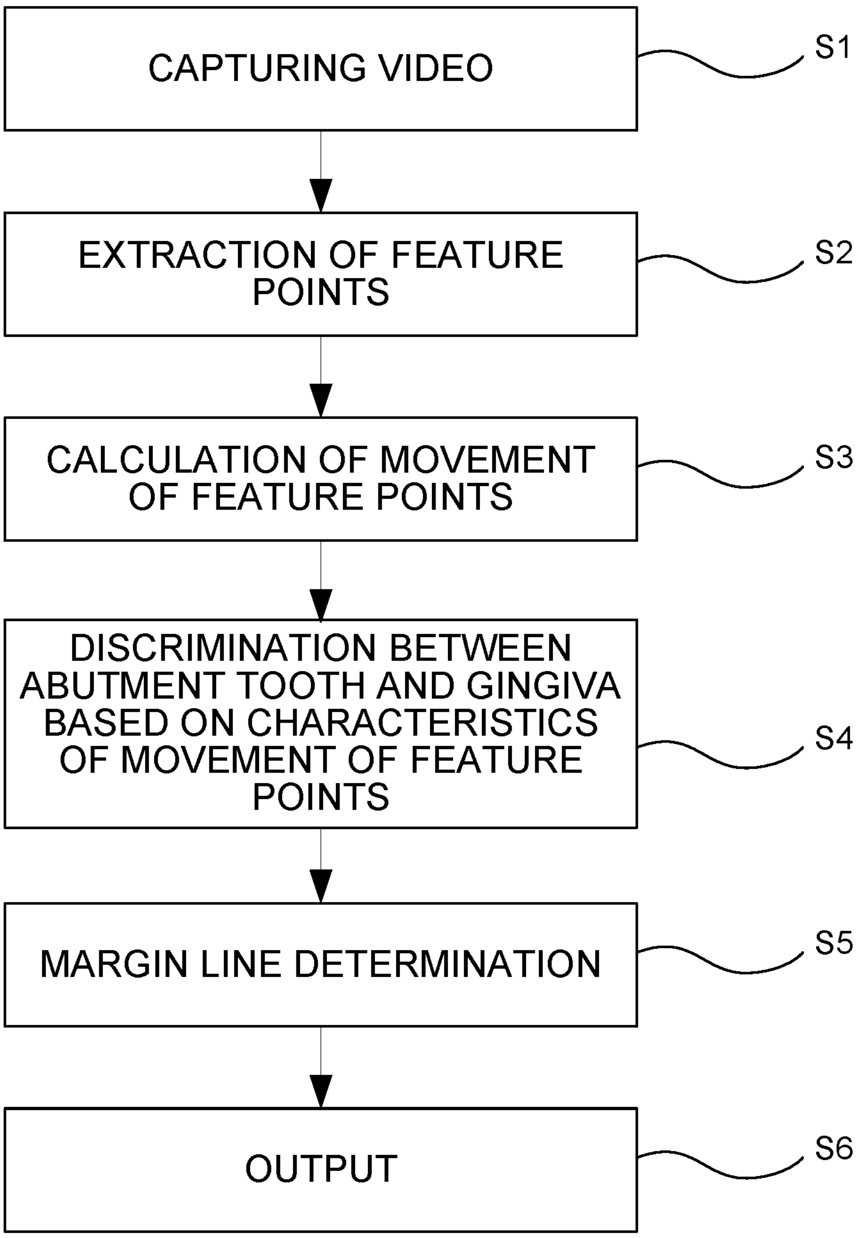
FIG. 5 is a flowchart showing the operation of the intraoral shape acquisition device according to Embodiment 2.

The flowchart in FIG. 5 is used to describe an example of the operation of the intraoral shape acquisition device 1. Here, the explanation will focus on the differences from Embodiment 1, and the explanation will be omitted for the configurations and operations already described in Embodiment 1.

Step 1: Capturing Video

The dentist aims the wand 11 at the subgingival margin of the abutment tooth and starts filming. The air blower 113 begins to operate, and the jet of compressed air pushes the pocket between the gingiva and abutment tooth. The scanner

111 starts taking pictures and continuously captures the intraoral shape around the abutment tooth under the gingival margin at a predetermined interval (frame rate). As a result, the model generation unit 133 outputs a plurality of chronologically consecutive models. This is a three-dimensional "moving image," so to speak. This "moving image" is stored in the memory device in the information processing unit 13.

Step 1: Extraction of Feature Points

The abutment tooth identification section 135 extracts feature points from each model included in the "movie. Typically, all or part of the point groups included in the models can be used as feature points.

Step 3: Calculation of Movement of Feature Points

The abutment tooth identification section 135 compares multiple temporally consecutive models to find corresponding feature points and records the coordinates of such feature points in each frame. This process is performed for all frames. That is, the coordinates n1 of the feature point N in the model at time t1, n2 of the feature point N in the model at time t2, n3 of the feature point N in the model at time t3 . . . are sequentially identified. Then, a data set {n1, n2, n3 . . . } indicating the movement of feature point N is generated. The same process is performed for other feature points O, P, Q . . . .

Step 4: Discrimination Between Abutment Tooth and Gingiva Based on Characteristics of Movement of Feature Points The abutment tooth discriminator 135 detects differences in the characteristics of movement of feature points. Typically, there are discrimination methods based on threshold values and machine learning.

(Discrimination by Threshold Value)

The abutment tooth discriminator 135 calculates an index for evaluating the movement of the feature point N based on the data set {n1, n2, n3 . . . } that shows the movement of the feature point N. For example, if the feature point N is vibrating, its amplitude and period can be calculated as indicators. The index is calculated in the same way for other feature points O, P, Q . . . .

The abutment tooth identification section 135 segregates feature points by applying a predefined threshold value to the calculated index. For example, a label indicating gingival is assigned to feature points whose amplitude exceeds the threshold value X, and a label indicating abutment tooth is assigned to feature points whose amplitude is below the threshold value X. Here, the threshold value can be a value obtained beforehand by testing, etc.

(Discrimination by Machine Learning)

The abutment tooth discriminator 135 can use the data set {n1, n2, n3 . . . } that shows the movement of the feature points N as training data and perform machine learning to separate the feature points into abutment teeth and gingiva. For example, the abutment tooth identification section 135 has a machine learning section 1351 that performs unsupervised learning. When the machine learning section 1351 receives a data set showing the movement of a large number of feature points as training data, it automatically identifies differences in their characteristics and forms a set (cluster) of feature points having the same characteristics. The machine learning section 1351 assigns labels indicating gingiva to the feature points in one cluster and labels indicating abutment teeth to the feature points in the other cluster.

The machine learning unit 1351 may use other known machine learning methods, such as supervised learning and deep learning, to separate feature points into abutment teeth and gingiva. For example, in supervised learning, during the learning phase, a number of known teacher data sets are provided to the machine learning section 1351, which are pairs of a data set indicating the movement of a feature point and a label indicating whether the feature point is a abutment tooth or a gingiva. In this way, the machine learning unit 1351 gradually learns the correlation between the data set indicating the movement of the feature point and the label indicating whether the feature point is a abutment tooth or a gingiva. As the learning progresses, the machine learning section 1351 will operate as an estimator, inputting an unknown data set indicating the motion of a feature point and outputting a label that is highly correlated to that feature point.

Step 5: Margin Line Determination

The abutment tooth identification section 135 identifies the boundary between the feature points determined to be abutment teeth and the feature points determined to be gingiva in step 4. This boundary is called the margin line. The abutment tooth identification section 135 generates a line (polyline) object indicating the margin line.

Step 6: Output of Model, Etc.

The abutment tooth identification section 135 outputs at least desired one of model of the abutment tooth, margin line, and model of gingiva.

According to this method, the intraoral shape acquisition device 1 can discriminate between abutment teeth and gingiva according to their different behaviors by analyzing time-series continuous model data. It can also automatically generate a model that reflects the exact shape of the abutment tooth and the margin line that is the boundary between the abutment tooth and the gingiva. This makes it possible to create a technical work with excellent conformity.

The present invention is not limited to the above-mentioned embodiments, but can be modified as appropriate to the extent that it does not depart from the purpose of the invention. For example, in the above embodiment, the intraoral shape acquisition device 1 acquires 3D point group data, but it may also acquire 2D image data, for example. In this case, the model generator 133 can construct a 3D model based on multiple 2D image data. The method of constructing a 3D model from 2D images is a well-known technique, so a detailed explanation is omitted.

In addition to the 3D point group data, the intraoral shape acquisition device 1 may additionally acquire information on the color and temperature of each feature point. In this case, for example, if the machine learning section 1351 uses these additional information as training data, the discrimination accuracy can be improved.

REFERENCE SIGNS LIST

1 Intraoral shape acquisition device
11 Wand
111 Scanner
1111 Light source
1113 Sensor
113 Air blower
1131 Air jet
1132 Attachment
13 Information processing unit
131 Sensing data acquisition section
133 Model generation section
135 Abutment tooth identification section
1351 Machine learning section

The invention claimed is:

1. A device for acquiring an intraoral shape, the device comprising:
- a scanner including a light source and a sensor for capturing intraoral geometry by imaging the inside of the intraoral shape;
- an air blower that injects compressed air; and
- an information processing device,
- wherein the air blower injects the compressed air against the object to be imaged when the scanner takes the images;
- wherein the scanner i) emits, with the light source, light to a plurality of points on a surface of the object, ii) detects, with the sensor, reflected light from each point on the surface of the object surface, and iii) continuously acquires sensing data of reflected light by the sensor indicating the intraoral shape while the air blower is injecting the compressed air against the object to be imaged;
- wherein the information processing device;
  - receives the sensing data indicating the intraoral shape from the scanner,
  - identifies a distance from the scanner to each point on the surface of the object based on the sensing data,
  - identifies coordinates of each point on the surface of the object based on the identified distance,
  - outputs point group data of each point on the surface of the object surface,
  - generates a plurality of chronologically consecutive three-dimensional models based on the based on the point group data,
  - extracts feature points from each model of the plurality of chronologically consecutive three-dimensional models,
  - compares multiple temporally consecutive models of the plurality of chronologically consecutive three-dimensional models to find corresponding feature points,
  - records the found corresponding feature points in each frame,
  - detects differences in characteristics of movement of the found corresponding feature points,
  - identifies the gingiva and the abutment tooth included in the model based on the characteristics of movement of the found corresponding feature points, and
  - outputs a three-dimensional model of the abutment tooth, margin line that indicates a boundary between the abutment tooth and the gingiva, and a three-dimensional model of the gingiva based on the identified gingiva and the identified abutment tooth.

2. The device for acquiring an intraoral shape according to claim 1, wherein
- the scanner and the air blower are built into a wand.

3. The device for acquiring an intraoral shape according to claim 1, wherein
- the air blower is detachable from the wand in which the scanner is built in.

4. The device for acquiring an intraoral shape according to claim 1, wherein detecting the differences in the characteristics of movement of the found corresponding feature points includes using a machine learning unit that separates the gingiva from the abutment tooth.

* * * * *